US012711507B2

(12) United States Patent
Allbright et al.

(10) Patent No.: US 12,711,507 B2
(45) Date of Patent: Aug. 18, 2026

(54) SYSTEMS AND METHODS FOR MODELING AND CLASSIFICATION OF FRAUDULENT TRANSACTIONS

(71) Applicant: Mastercard International Incorporated, Purchase, NY (US)

(72) Inventors: Joshua A. Allbright, Valley Park, MO (US); Christopher John Merz, Wildwood, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/837,686

(22) Filed: Apr. 1, 2020

(65) Prior Publication Data

US 2021/0312451 A1 Oct. 7, 2021

(51) Int. Cl.
*G06Q 20/32* (2012.01)
*G06F 16/23* (2019.01)
(Continued)

(52) U.S. Cl.
CPC ......... *G06Q 20/4016* (2013.01); *G06N 20/00* (2019.01); *G06Q 20/3223* (2013.01); *G06Q 20/407* (2013.01)

(58) Field of Classification Search
CPC ............... G06Q 20/4016; G06Q 40/00; G06Q 20/3223; G06Q 20/407; G06N 20/00; G06K 9/6256
See application file for complete search history.

(56) References Cited

U.S. PATENT DOCUMENTS 6,601,048 B1 7/2003 Gavan et al.
6,938,003 B2 8/2005 Harpale
(Continued)

FOREIGN PATENT DOCUMENTS

CN 108492173 A 9/2018
CN 108681965 A 10/2018
(Continued)

OTHER PUBLICATIONS

PCT International Search Report and Written Opinion, Application No. PCT/US2021/023573, dated Jul. 1, 2021, 6 pps.
(Continued)

*Primary Examiner* — Jessica Lemieux
*Assistant Examiner* — Douglas W Pinsky
(74) *Attorney, Agent, or Firm* — Armstrong Teasdale LLP

(57) ABSTRACT

Described herein are systems and methods for classifying incoming payment transactions. A fraud classification computing system includes a historical transaction database for storing a plurality of transaction records associated with a respective plurality of historical transactions. The fraud classification computing system receives a current transaction request message associated with a current payment transaction. The fraud classification computing system applies a multi-class fraud prediction model to the current transaction request message to generate scores indicating a relative likelihood that the current payment transaction is each of a plurality of fraudulent transaction types. The fraud classification computing system identifies a most likely transaction classification identifier and generates a transaction classification message for the current payment transaction.

17 Claims, 4 Drawing Sheets

(51) Int. Cl.

| | |
|---|---|
| ***G06N 20/00*** | (2019.01) |
| ***G06Q 20/10*** | (2012.01) |
| ***G06Q 20/36*** | (2012.01) |
| ***G06Q 20/38*** | (2012.01) |
| ***G06Q 20/40*** | (2012.01) |
| ***G06Q 40/06*** | (2012.01) |
| ***H04L 29/06*** | (2006.01) |
| ***H04W 12/06*** | (2021.01) |
| ***H04W 12/08*** | (2021.01) |
| *G06F 21/31* | (2013.01) |
| *G06F 21/32* | (2013.01) |
| *G06F 21/45* | (2013.01) |
| *G06Q 20/34* | (2012.01) |
| *G06Q 40/02* | (2023.01) |
| *H04W 4/14* | (2009.01) |
| *H04W 12/062* | (2021.01) |
| *H04W 12/72* | (2021.01) |
| *H04W 60/00* | (2009.01) |

(56) References Cited

U.S. PATENT DOCUMENTS 7,263,506 B2 8/2007 Lee et al.
7,527,195 B2 5/2009 Keithley et al.
7,788,195 B1* 8/2010 Subramanian ......... G06N 20/00 706/20
7,835,863 B2 11/2010 Lokshin et al.
8,001,042 B1 8/2011 Hakan et al.
8,032,438 B1 10/2011 Barton et al.
8,104,679 B2 1/2012 Brown
8,402,098 B2 3/2013 Dircz
8,531,180 B2 9/2013 Piemonte et al.
8,566,234 B2 10/2013 Hoefelmeyer
8,788,193 B2 7/2014 Fauci et al.
9,210,183 B2 12/2015 Sadovsky et al.
9,243,916 B2 1/2016 Roumeliotis et al.
9,347,205 B2 5/2016 Kosarev et al.
9,367,844 B1* 6/2016 Hu ..................... G06Q 20/4016
9,596,264 B2 3/2017 Sandke et al.
9,858,575 B2 1/2018 Meredith et al.
9,978,067 B1* 5/2018 Sadaghiani ............ G06N 20/00
10,015,178 B2 7/2018 Schulman et al.
10,063,654 B2 8/2018 Kirti et al.
10,075,464 B2 9/2018 Kesin et al.
10,482,464 B1 11/2019 Dietrich
10,586,235 B2 3/2020 Wang et al.
10,832,248 B1* 11/2020 Kramme ................ G06N 20/00
2001/0049690 A1 12/2001 McConnell et al.
2003/0236652 A1 12/2003 Scherrer et al.
2005/0193281 A1 9/2005 Ide et al.
2006/0190783 A1 8/2006 Crop et al.
2007/0038568 A1* 2/2007 Greene ................ G06Q 50/188 705/50
2007/0038674 A1* 2/2007 Bejar .................. G06F 21/6218
2007/0294187 A1 12/2007 Scherrer
2008/0024129 A1 1/2008 Heid
2008/0133407 A1 6/2008 Guillory et al.
2010/0169192 A1* 7/2010 Zoldi ..................... G06Q 40/00 705/30
2010/0305993 A1 12/2010 Fisher
2011/0016052 A1* 1/2011 Scragg ................. G06Q 20/405 705/44
2011/0225076 A1* 9/2011 Wang ..................... G06Q 40/02 705/35
2011/0264612 A1* 10/2011 Ryman-Tubb ..... G06Q 20/4016 706/12
2012/0096549 A1 4/2012 Amini et al.
2012/0101940 A1 4/2012 Brennan et al.
2012/0197802 A1* 8/2012 Smith ................ G06Q 20/4016 705/44
2013/0024361 A1 1/2013 Choudhuri et al.
2013/0054438 A1* 2/2013 Boding ................ G06Q 20/405 705/35
2013/0132275 A1 5/2013 Enzaldo et al.
2013/0283378 A1 10/2013 Costigan et al.
2013/0291099 A1 10/2013 Donfried et al.
2014/0188638 A1 7/2014 Jones et al.
2014/0283005 A1 9/2014 Avni et al.
2014/0324677 A1 10/2014 Walraven et al.
2015/0095247 A1 4/2015 Duan
2015/0134512 A1 5/2015 Mueller
2015/0178735 A1 6/2015 Liu
2015/0220619 A1* 8/2015 Gray ....................... G06F 16/22 707/738
2015/0317515 A1 11/2015 Lee et al.
2016/0005029 A1 1/2016 Ivey
2016/0042353 A1 2/2016 Canis et al.
2016/0042354 A1 2/2016 Canis et al.
2016/0063501 A1* 3/2016 Kalyan ................ G06Q 20/108 705/42
2016/0260100 A1* 9/2016 Wiesman ........... G06Q 20/4016
2016/0335639 A1* 11/2016 Merz .................. G06Q 20/4016
2017/0103340 A1 4/2017 Zoldi et al.
2017/0111364 A1 4/2017 Rawat
2017/0140382 A1 5/2017 Chari et al.
2017/0148025 A1 5/2017 Le et al.
2017/0177937 A1 6/2017 Harmsen et al.
2017/0178134 A1 6/2017 Senci
2017/0270529 A1 9/2017 Ebel et al.
2018/0082371 A1 3/2018 Chandler
2018/0121922 A1 5/2018 Zoldi et al.
2019/0073647 A1* 3/2019 Zoldi ................. G06Q 20/4016
2019/0114624 A1* 4/2019 Piel ........................ G06Q 20/08
2019/0173893 A1 6/2019 Muddu et al.
2019/0220863 A1 7/2019 Novick et al.
2019/0236608 A1 8/2019 Formsma et al.
2019/0266609 A1 8/2019 Phelan et al.
2019/0295087 A1 9/2019 Jia et al.
2019/0311366 A1 10/2019 Zoldi et al.
2019/0370800 A1 12/2019 Song et al.
2019/0392450 A1* 12/2019 Gosset ................. G06Q 20/401
2020/0004957 A1* 1/2020 Chamaraju ............ G06N 20/00
2020/0074471 A1 3/2020 Adjaoute
2020/0074472 A1 3/2020 Adjaoute
2020/0167784 A1 5/2020 Kursun
2021/0142335 A1* 5/2021 Riffert ................ G06Q 30/0185
2021/0182858 A1* 6/2021 Wardman ........... G06Q 20/3821
2021/0248614 A1 8/2021 Adjaoute
2021/0312450 A1 10/2021 Allbright
2021/0312452 A1 10/2021 Allbright
2021/0312453 A1 10/2021 Allbright

FOREIGN PATENT DOCUMENTS

CN 106547711 B 3/2020
JP 5371214 B2 12/2013
WO 2022008130 A1 1/2022

OTHER PUBLICATIONS

PCT International Search Report and Written Opinion, Application No. PCT/US2021/023573, dated Jun. 24, 2024, 9 pps.
PCT International Search Report and Written Opinion, Application No. PCT/US2021/024056, dated Jul. 1, 2021, 6 pps.
PCT International Search Report and Written Opinion, Application No. PCT/US2021/024065, dated Jun. 24, 2021, 7 pps.
“A method for real-time enhancement of electronic payment fraud detection from distributed sources”, The IP.com Journal, (Year: 2012).
Popat et al., “A Survey on Credit Card Fraud Detection Using Machine Learning”, (Year: 2018).
Rajeshwari et al., “Real-time credit card fraud detection using Streaming Analytics”, 2nd International Conference on Applied and Theoretical Computing and Communication Technology (iCATccT), 2016), 6 pages.
EP Extended Search Report, Application No. 21778749.8, dated Jan. 29, 2024, 8 pps.
Gaetano Papale et al., “SDD Sentinel: A Support Tool for Detecting and Investigating Electronic Transaction Frauds”, IEEE Computer Society, 2017, pp. 318-323.

(56) References Cited

OTHER PUBLICATIONS

Alejandro Correa Bahnsen et al., "Feature engineering strategies for credit card fraud detection", Expert Systems With Applications, vol. 51, Jun. 1, 2016, pp. 134-142.
Daniel Barbara et al., "The New Jersey Data Reduction Report", Bulletin of the IEEE Computer Society Technical Committee on Data Engineering, Dec. 31, 1997, pp. 3-45.

* cited by examiner

SYSTEMS AND METHODS FOR MODELING AND CLASSIFICATION OF FRAUDULENT TRANSACTIONS

BACKGROUND

The field of the present disclosure relates generally to modelling and classification of fraudulent transactions, and, more particularly, to modelling incoming transactions and determining scores for a plurality of fraudulent transaction types indicating a relative likelihood that a current transaction is a specific fraudulent transaction type.

In some known cases, transaction classification systems are used to determine if a payment transaction is either a fraudulent transaction or a genuine transaction. Fraudulent transactions include, in at least some cases, payment transactions initiated using a payment card without the consent and/or knowledge of a legitimate cardholder of the payment card. Genuine transactions include payment transactions initiated with the consent and/or knowledge of the cardholder. At least some known fraud detection systems include fraud models that classify payment transactions into these two generic transaction categories, fraudulent or genuine. This binary classification of payment transactions does not typically provide additional details regarding the parameters and/or circumstances associated with the transaction. Moreover, these fraud models are commonly built and/or trained to recognize only a single type of fraud. Therefore, these known transaction classification systems provide little to no additional information that can be used to distinguish between various methods and/or techniques that are used by fraudsters to initiate a fraudulent transaction.

It may be advantageous to provide methods and systems that can be used to identify and classify fraudulent transaction types for a plurality of fraudulent transaction types, to predict a likely type of fraudulent behavior.

BRIEF DESCRIPTION

In one aspect, a fraudulent classification computer system for classifying incoming payment transactions is provided. The computer system includes a historical transaction database for storing a plurality of transaction records associated with a respective plurality of historical transactions. Each transaction record includes a transaction classification identifier, a merchant identifier, and a transaction amount each associated with the respective historical transaction. The transaction classification identifier identifies a fraudulent transaction type assigned to the respective historical transaction from a plurality of fraudulent transaction types. The computer system includes at least one processor in communication with the historical transaction database that is programmed to receive a current transaction request message associated with a current payment transaction initiated by a suspect consumer with a merchant using a payment card. The current transaction request message includes a merchant identifier of the merchant and a transaction amount for the current payment transaction. The at least one processor is further programmed to apply a multi-class fraud prediction model to the current transaction request message to generate scores indicating a relative likelihood that the current payment transaction is each of the plurality of fraudulent transaction types. The at least one processor is further programmed identify a most likely transaction classification identifier associated with the fraudulent transaction type that is scored as the most likely fraudulent transaction type. The at least one processor is also programmed to generate a transaction classification message for the current payment transaction. The transaction classification message includes the most likely transaction classification identifier and the scores associated with the identified fraudulent transaction.

In another aspect, a computer-implemented method for classifying incoming payment transactions is provided. The method is implemented using a computing device including a processor in communication with a historical transaction database for storing a plurality of transaction records associated with a respective plurality of historical transactions. Each transaction record including a transaction classification identifier, a merchant identifier, and a transaction amount each associated with the respective historical transaction, wherein the transaction classification identifier identifies a fraudulent transaction type assigned to the respective historical transaction from a plurality of fraudulent transaction types. The method includes receiving a current transaction request message associated with a current payment transaction initiated by a suspect consumer with a merchant using a payment card. The current transaction request message includes a merchant identifier of the merchant and a transaction amount for the current payment transaction. The method also includes applying a multi-class fraud prediction model to the current transaction request message to generate scores indicating a relative likelihood that the current payment transaction is each of the plurality of fraudulent transaction types. The method further includes identifying a most likely transaction classification identifier associated with the fraudulent transaction type that is scored as the most likely fraudulent transaction type, and generating a transaction classification message for the current payment transaction. The transaction classification message includes the most likely transaction classification identifier and the scores associated with the identified fraudulent transaction.

In yet another aspect, a non-transitory computer-readable storage medium that includes computer-executable instructions for classifying incoming payment transactions is provided. When executed by a computing device including a historical transaction database, the historical transaction database storing a plurality of transaction records associated with a respective plurality of historical transactions, each transaction record including a transaction classification identifier, a merchant identifier, and a transaction amount each associated with the respective historical transaction, the transaction classification identifier identifying a fraudulent transaction type assigned to the respective historical transaction from a plurality of fraudulent transaction types, and at least one processor in communication with the historical transaction database, the computer-executable instructions cause the at least one processor to receive a current transaction request message associated with a current payment transaction initiated by a suspect consumer with a merchant using a payment card. The current transaction request message includes a merchant identifier of the merchant and a transaction amount for the current payment transaction. The computer-executable instructions also cause the at least one processor to apply a multi-class fraud prediction model to the current transaction request message to generate scores indicating a relative likelihood that the current payment transaction is each of the plurality of fraudulent transaction types. The computer-executable instructions also cause the at least one processor to identify a most likely transaction classification identifier associated with the fraudulent transaction type that is scored as the most likely fraudulent transaction type, and generate a transaction classification message for the current payment transaction. The transaction classification message including the most likely transaction classification identifier and the scores associated with the identified fraudulent transaction.

BRIEF DESCRIPTION OF THE DRAWINGS

FIG. 1 is a simplified schematic diagram of a transaction classification system including a fraud detection computing device for classifying fraudulent transactions in accordance with the present disclosure;

FIG. 2 depicts an example transaction classification message that may be generated using the transaction classification system shown in FIG. 1;

FIG. 3 is a process flow diagram of an example transaction classification method implemented using the transaction classification system shown in FIG. 1; and FIG. 4 illustrates an example configuration of a server computing device that may be used in the transaction classification system shown in FIG. 1.

DETAILED DESCRIPTION

Figure 1:
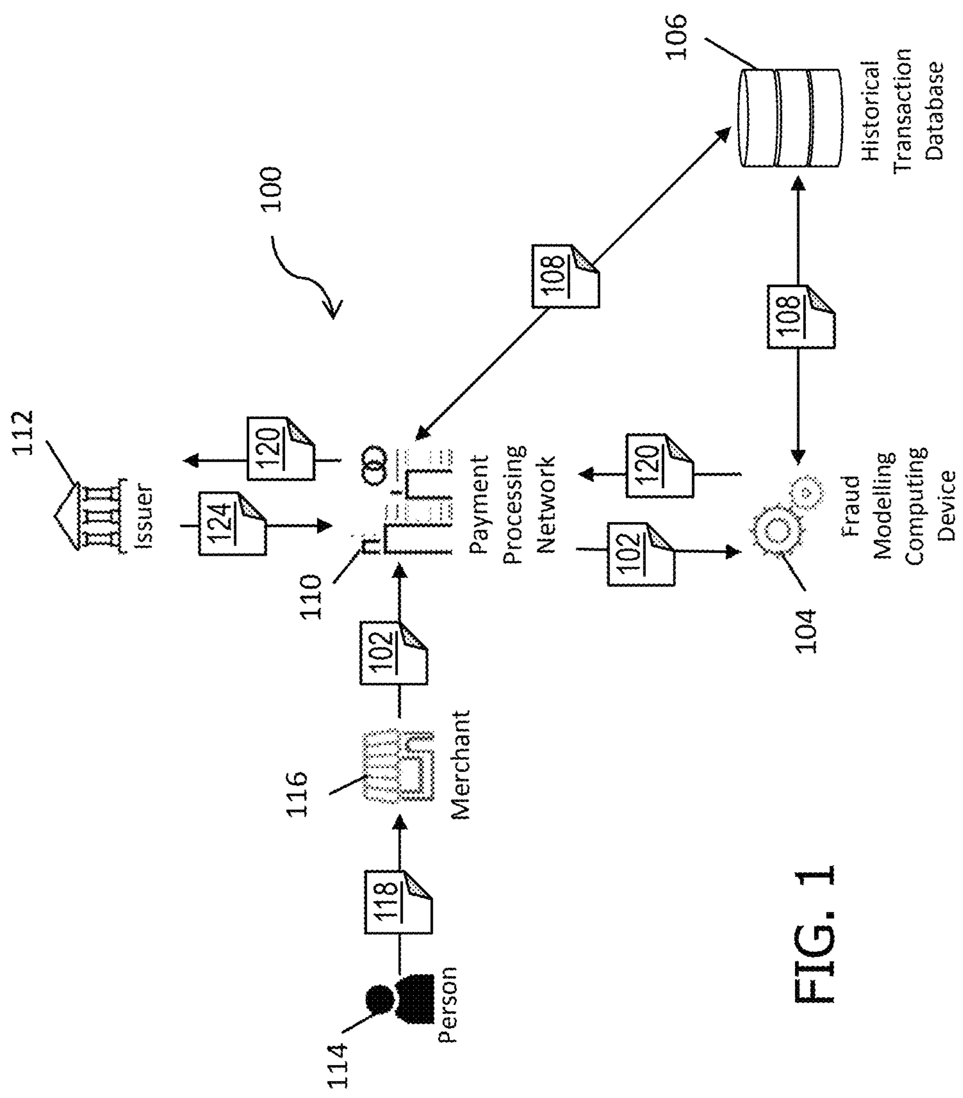
FIGS. 1-4 show example embodiments of the methods and systems described herein.

The systems and methods described herein are directed to applying a multi-class fraud prediction model to a current transaction request message. The multi-class fraud prediction model is built and/or trained to recognize a plurality of different fraudulent transactions types, which include a "genuine" transaction type (e.g., a "not fraudulent" fraudulent transaction type) as well as a plurality of fraudulent transaction types associated with a respective plurality of types of fraud that may be enacted using a payment card. The multi-class fraud prediction model generates, for the current transaction request message, a respective score associated with each of the plurality of fraudulent transaction types. Each score indicates a relative likelihood that the current transaction is the respective fraudulent transaction type. A fraudulent transaction classification message is generated and sent to at least one party to the current transaction (e.g., an issuer), wherein the transaction classification message includes an indicator of at least one most likely fraudulent transaction type for the current transaction.

Payment card fraud is a broad term used to describe fraudulent use of a payment card (e.g., a credit card or a debit card), where payment card credentials are presented to initiate a purchase transaction without the consent and/or knowledge of the legitimate or genuine cardholder. Each fraudulent transaction type described herein is associated with the method and/or techniques employed by a fraudster to initiate a fraudulent payment transaction. For example, a first fraudulent transaction type may include a "Bank Identification Number (BIN) fraud type." The BIN fraud type may be associated with a fraudster searching for valid card numbers by iteratively attempting to initiate a payment transaction using card numbers that are consecutive to a previously identified valid card number. A second fraudulent transaction type may include a phishing fraud type. A phishing fraud type may be associated with a fraudulent or compromised merchant that fraudulently prompts a consumer to provide their payment card credentials so that the fraudster is able to capture this information. A third fraud type may be associated with "friendly fraud." For example, a child, without the knowledge of their parents, may make purchases of digital goods (e.g., on a smart phone, such as purchasing games or "in-app purchases") using their parent's payment card or account. When the parent becomes aware of these purchases, the parent may initiate a dispute of the charges. If/when the issuer of their payment card or account successfully disputes or charges back these purchases to the associated merchant, the issuer reports the disputed transaction(s) as fraud, because the purchases were not authorized, even though there was no malicious intent. Fraudulent transaction types may include alternative or additional transaction types that may be associated with alternative or additional methods or techniques used by fraudsters to initiate one or more fraudulent payment transactions.

The plurality of fraudulent transaction types described herein may also include genuine or "not fraudulent" fraudulent transaction types. Genuine transaction types may include a true genuine transaction, in which the legitimate cardholder uses their payment card credentials to initiate an intended payment transaction. A transaction may be identified as "genuine" based on any number of factors, such as transaction attributes (e.g., location, merchant, transaction amount, etc.) that are shared with other transactions previously performed by the cardholder, or using any other fraud detection techniques.

In some embodiments, the multi-class fraud prediction model may be generated based on a set of model training data using machine learning techniques. The model training data includes a set of historical transaction records (e.g., hundreds, thousands, tens of thousands, hundreds of thousands, etc., of historical transaction records) obtained from a historical transaction database. The model training data may be used to train the multi-class fraud prediction model, to develop a set of rules or conditions that may be applied to current, real-time payment transactions and generate or output scores representative of a plurality of fraudulent transaction types for each payment transaction.

The historical transaction database stores a plurality of transaction records associated with a plurality of historical payment transactions. Each transaction record includes a transaction classification identifier, a merchant identifier, and a transaction amount. In some example embodiments, the transaction records may include alternative or additional information, for example and without limitation, transaction location, transaction date/time, etc. The transaction classification identifier identifies at least one of the fraudulent transaction types—from the plurality of fraudulent transaction types—for the historical transaction, including whether the transaction was identified as being any one type of fraud (e.g., what technique was used to commit the fraud) or as a genuine transaction.

In some embodiments, the model training data may include a transaction velocity determined relative to a transaction time of a "subject" payment transaction with which the transaction velocity is associated. Transaction velocities may leverage parameters or details associated with the techniques and methods used by fraudsters to initiate fraudulent payment transactions to identify those fraudulent payment transactions. The transaction velocity is determined by summing and/or counting a parameter of the historical transaction records occurring prior to the subject payment transaction. For example, transaction velocities may include the number of transactions occurring with the same merchant of the subject payment transaction during a period of time prior to the initiation of the subject payment transaction (i.e., the parameter of interest to determine the transaction velocity is the merchant identifier). In other cases, the transaction velocity is the average transaction amount for a plurality of transactions occurring over a time period prior to the initiation of the subject payment transaction, or any other interval of time (e.g., an average number of transactions over any half-hour interval).

In other example embodiments, transaction velocity may include the number of payment card numbers or account numbers, within a range of the card or account number used in the subject payment transaction, occurring over a time period prior to the subject payment transaction (e.g., payment account numbers sharing the same BIN as the account number used to initiate the subject payment transaction). For example, as described earlier, a fraudster may initiate a BIN fraud attack by iteratively initiating payment transactions using credit card numbers that share a common BIN (e.g., a first 6 or more digits of a primary account number (PAN) that may be used to initiated a payment card transaction) in an attempt to identify a valid card number (e.g., PAN). The iterative initiation attempts of card numbers sharing this common BIN may be captured by the fraud classification model by employing a transaction velocity technique. A "current" transaction velocity for a "current" subject payment transaction may be determined (e.g., by the fraud classification model) by counting the number of card numbers with a common BIN—that is shared by the card number of a current subject payment transaction—that are used to initiate payment transactions within a period of time prior to the current subject payment transaction. The multi-class fraud prediction model may determine that a fraudulent transaction type of a BIN fraud is likely occurring, where the current transaction velocity is much higher (e.g., more than one or two standard deviations higher, a percentage higher, etc.) than a standard or expected transaction velocity from the historical transaction records of the model training data used to build the multi-class fraud prediction model. In other words, the multi-class fraud prediction model may identify that a BIN fraud attacked is likely occurring if the transaction velocity indicates that a higher frequency of payment transactions are being initiated using card numbers sharing a common BIN, with respect the card number used in the current payment transaction.

In the example embodiment, the multi-class prediction model generates a score indicating a relative likelihood that a current payment transaction is any one of a plurality of fraudulent transaction types, including a genuine transaction type. The score may be interpreted as a metric that identifies how likely it is that a current payment transaction is a particular fraudulent transaction type, as compared to the other fraudulent transaction types.

In the example embodiment, the score(s) output from the multi-class fraud prediction model are used to generate at least one "most likely" transaction classification identifier. The most likely transaction classification identifier is associated with a respective at least one identified fraudulent transaction type having a greatest likelihood (e.g., highest score) of being the fraudulent transaction type for that transaction. Further, the transaction classification identifier may be used to identify the particular fraudulent transaction type of the current payment transaction. It is contemplated that a vast majority of transactions may have a transaction classification identifier associated with a genuine transaction type—that is, that most transactions are legitimate, genuine transactions.

In this illustrated embodiment, a transaction classification message is generated for the current payment transaction. The transaction classification message includes the at least one most likely transaction classification identifier and the score associated with the current payment transaction. In some example embodiments, the score for a current payment transaction includes sub-scores for each of the plurality of fraudulent transaction types. These sub-scores may also be referred to as scores, such that the term "score" may refer to an overall score for a current payment transaction and/or a score associated with an individual fraudulent transaction type. In some embodiments, the scores determined for each of the plurality of transaction types may be summed together to equal one or sum to equal 100%. The fraudulent transaction type that has the highest relative score may be interpreted as the most likely fraudulent transaction type for a current payment transaction. For example, the multi-class fraud prediction model may be applied to a first current payment transaction and a plurality of scores may be generated for a plurality of fraudulent transaction types, resulting in a fraud type 1 with a score of 90% (or 0.9), a fraud type 2 with score of 5% (or 0.05), a fraud type 3 with a score of 5% (or 0.05), and a fraud type 4 or "genuine" type with a score of 0% (or 0.00). The highest score of 90%, associated with the fraud type 1, is an indication that the current payment transaction is most likely a transaction of the fraud type 1.

In other example embodiments, the scores may represent additional or alternative conditions that may be used to identify a likely fraudulent transaction type of a current payment transaction. For example, the scores may include a ranking of fraudulent transaction types. In other words, the fraudulent transaction types may be ranked from 1 to "n", (n being the number of fraudulent transaction types modelled by the multi-class fraud prediction model), with the rank 1 indicating a most likely fraudulent transaction type for the current payment transaction. For example, the multi-class fraud prediction model may be applied to a second current payment transaction, and a plurality of fraudulent transaction types may be ranked, resulting in fraud types 1, 2, 3, and 4 being ranked 1, 2, 3, and 4, respectively. The fraud type 1 with the rank of 1 is an indication that the current payment transaction is most likely a transaction of the fraud type 1.

The transaction classification message is transmitted to a downstream party to the current payment transaction (e.g., an issuer of the payment card credentials used to initiate the current payment transaction). In some embodiments, the transaction classification message further includes an outcome recommendation based on the most likely transaction classification identifier. For example, when the most likely transaction classification identifier is "genuine," the outcome recommendation includes a recommendation to authorize the current payment transaction. Conversely, when the most likely transaction classification identifier is any fraud type, the outcome recommendation includes a recommendation to decline the current payment transaction. In certain instances, where there is more than one most likely transaction classification identifier, such as a near-tied scored between a genuine transaction type and another fraudulent transaction type, the outcome recommendation includes a recommendation for additional authentication or verification procedures (e.g., a recommendation to initiate a step-up challenge).

Moreover, based on the output from the multi-class fraud prediction model, various other fraud prevention and mitigation processes may be recommended and/or implemented. For example, where a current payment transaction is scored as indicating a BIN attack fraud type, additional computational resources may be deployed to increase scrutiny of and/or decline other incoming payment transactions for other PANs sharing the same BIN (e.g., a new server for fraud detection may be deployed or brought online to address the detected fraud). In the example embodiment, the multi-class fraud prediction model is applied to current or real-time incoming payment transactions, such that fraud prevention steps may be recommended and/or implemented in real-time, responsive to the output(s) from the multi-class fraud prediction model. As used herein, “real-time” refers to operations performed during authorization of a payment card transaction (i.e., between the moment that a new payment card transaction is initiated from, for example, a merchant, and the time that an authorization decision is made, for example, back to that merchant). In such a context, “real-time” operations are operations conducted during the authorization process for that transaction.

In other example embodiments, model training data may include a prior transaction history of the payment card or payment account used in the current payment transaction (e.g., historical transaction records of previous payment transactions initiated with the payment card). For example, the prior transaction history may include the merchants, transaction amount, dates, times, and/or locations of the previous payment transactions.

In some embodiments, where a cardholder previously used their payment card credentials to initiate a transaction with a fraudulent merchant, such that a phishing fraud may have occurred, then those payment card credentials may be considered compromised during subsequent payment transactions initiated with the same credentials. In other words, if a payment card credentials have been previously presented to a known fraudulent merchant or otherwise used to initiate a known fraudulent transaction, then subsequent payment transactions initiated using the compromised payment card credentials may be considered suspect. The model training data may include the transaction history for those payment card credentials previously presented to a fraudulent merchant. The multi-class predication model, using the model training data, may generate a score indicating that the current payment transaction is most likely a transaction type associated with a phishing fraud.

In some example embodiments, the model training data may include transaction location history. For example, a cardholder may have previously presented their payment card information to initiate a transaction with a merchant typically at locations near a residential location of the cardholder and/or within the residential city of the cardholder. The multi-class predication model, using the model training data, may compare a transaction location of a current payment with the transaction location history in order to determine scores. In some cases, payment card information may have been used at a merchant location that is not proximate to or associated with any of the previous locations included in the transaction location history. Accordingly, the multi-class predication model, using the model training data, may generate a score indicating that the current payment transaction is most likely a transaction type associated with a stolen payment.

At least one technical problem to be solved by the systems and methods provided herein includes: (i) inability to distinguish between a plurality of fraudulent transaction types using a same model, thereby requiring many models (and computing resources) to run for a same transaction to identify any one transaction fraud type, (ii) inability to rank or score a plurality of fraudulent transaction types to determine a most likely fraudulent transaction type for any given transaction, and (iii) lack of transparency to issuers regarding why any one transaction is or is not considered fraudulent.

The technical effect of the systems and processes described herein may be achieved by performing at least one of the following steps: (i) receiving a current transaction request message associated with a current payment transaction initiated by a suspect consumer with a merchant using a payment card. The current transaction request message including a merchant identifier of the merchant and a transaction amount for the current payment transaction, (ii) applying a multi-class fraud prediction model to the current transaction request message to generate one or more scores indicating a relative likelihood that the current payment transaction is each of the plurality of fraudulent transaction types, (iii) identifying a most likely transaction classification identifier associated with the fraudulent transaction type that is scored as the most likely fraudulent transaction type, and/or (iv) generating a transaction classification message for the current payment transaction, the transaction classification message including the most likely transaction classification identifier and the scores associated with the identified fraudulent transaction.

A technical effect or improvement provided by the systems and processes described herein include at least one of: (i) generating one or more scores indicating the relative likelihood that a current payment transaction is each of a plurality of fraudulent transaction types using a single model, thereby improving fraud detection and prevention while reducing computing and processing burdens, (ii) identifying at least one most likely fraud transaction type of a current payment transaction, (iii) generating a transaction classification message that may be used to classify the current payment transaction into a fraudulent transaction type, improving transparency with issuers, (iv) by knowing the type of fraud being committed, additional steps to mitigate or prevent that type of fraud can be taken, (v) reducing network messaging associated with fraudulent transactions (e.g., chargeback messaging), and (vi) reducing network bandwidth expended on processing fraudulent transactions, at least in part by identifying the specific type of fraud associated with any transaction. No known systems identify the specific type of fraud that was committed (e.g., the techniques used to commit the fraud). Using the systems and methods described herein to identify the particular type of fraud associated with any transaction, more precise recommendations can be generated and more precise fraud mitigation measures can be enacted.

As used herein, a processor may include any programmable system including systems using micro-controllers, reduced instruction set circuits (RISC), application specific integrated circuits (ASICs), logic circuits, and any other circuits or processor capable of executing the functions described herein.

As used herein, the terms “software” and “firmware” are interchangeable, and include any computer program stored in memory for execution by a processor, including RAM memory, ROM memory, EPROM memory, EEPROM memory, and non-volatile RAM (NVRAM) memory. The above memory types are example only, and thus are not limiting as to the types of memory usable for saving of a computer.

In one embodiment, a computer program is provided, and the program is embodied on a computer readable medium. In an example embodiment, the data optimization system is executed on a single computer system, without requiring a connection to a server computer. In a further embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, a card that is part of a digital wallet, and/or any other device that may hold payment account information, such as mobile phones, smartphones, personal digital assistants (PDAs), key fobs, and/or computers. Each type of transaction card can be used as a method of payment for performing a transaction. As used herein, the term "payment account" is used generally to refer to the underlying account associated with the transaction card.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 is a schematic diagram of an example fraudulent transaction classification system 100 for modeling and classification of current transaction request messages 102, and determining scores associated with a plurality of fraudulent transaction types, indicating the relative likelihood that current transaction request message 102 is a specific fraudulent transaction type, in accordance with the present disclosure. Fraudulent transaction classification system 100 includes a fraud modelling computing device 104 that is communicatively coupled to a historical transaction database 106.

Fraud modelling computing device 104 stores a plurality of transaction records 108 in historical transaction database 106. Additionally or alternatively, transaction records 108 may be stored in historical transaction database 106 by other entities. The plurality of transaction records 108 are associated with a plurality of historical payment transactions. Each transaction record 108 may include a transaction classification identifier, a merchant identifier, and a transaction amount. The merchant identifier uniquely identifies the merchant at which the historical transaction was initiated. The transaction classification identifier identifies a fraudulent transaction type—from the plurality of fraudulent transaction types—for the historical transaction. In other example embodiments, transaction records 108 may include additional or alternative data associated with the historical payment transaction. For example, transaction record 108 may include, for example and without limitation, transaction dates and times, transaction locations, and the like.

In some example embodiments, fraud modelling computing device 104 may be integral with and/or communicatively coupled with a processor of a payment processing network 110. Payment processing network 110 includes a set of proprietary communications standard for the exchange of financial transaction data and the settlement of funds between financial institutions. Payment processing network 110 is configured to process payment/purchase transactions for a plurality of cardholders with a plurality of merchants, by transmitting various authorization request and response messages between parties to the transaction (e.g., the merchant, an acquirer, and an issuer). As used herein, "payment processing network" refers broadly to the network and/or to one or more computing devices associated therewith (e.g., payment processors or payment processing computing devices). In some example embodiments, payment processing network 110 is communicatively coupled to historical transaction database 106. Payment processing network 110 may store transaction records 108 in historical transaction database 106 and/or retrieve transaction records 108 therefrom. In some example embodiments, fraud modelling computing device 104 may facilitate transfer and storage of transaction records 108 between payment processing network 110 and historical transaction database 106.

Payment processing network and/or the fraud modelling computing device may be communicatively coupled to an issuer 112. Issuer 112 is responsible for issuing and maintaining payment cards and associated payment accounts and acts to perform various processing functions such as settlement and clearing of payment transactions. Issuer 112 may issue a payment card number associated with a payment card account, such as a credit card or a debit card to a cardholder. The cardholder may use the payment card number to tender payment for a purchase from a merchant.

As described herein, the plurality of fraudulent transaction types may include a genuine transaction type and/or a plurality of fraud transaction types. The genuine transaction types may include a true genuine transaction, in which the legitimate cardholder uses their payment card credentials to initiate an intended payment transaction. Each fraudulent transaction type may be associated with the method and/or techniques employed by a fraudster to initiate a fraudulent payment transaction. For example, a first fraud transaction type may be committed using BIN fraud techniques. In another example, a second fraud transaction type may be committed using phishing techniques. Each transaction classification identifier identifies a fraudulent transaction type assigned to the historical transaction from a plurality of fraudulent transaction types. Therefore, the multi-class fraud prediction model is applied to all incoming transactions to analyze those transactions for fraud (e.g., whether the transaction is fraudulent or genuine). The multi-class fraud prediction model is configured to easily and efficiently be applied, in real-time, while the transaction is being performed, such that fraud modelling computing device 104 may generate a recommendation and/or implement any fraud mitigation procedures in real-time.

Fraud modelling computing device 104 generates a multi-class fraud prediction model based on a set of model training data using machine learning techniques. Fraud modelling computing device 104 creates the model training data by retrieving a set of historical transaction records 108 (e.g., hundreds, thousands, tens of thousands, hundreds of thousands, etc. of historical transaction records) from historical transaction database 106. Fraud modelling computing device 104 uses the model training data to train the multi-class fraud prediction model, such as to develop a set of rules or conditions that may be applied to current payment transaction message 102 and generate or output scores representative of a plurality of fraudulent transaction types for each payment transaction.

In some example embodiments, the model training data may include a transaction velocity determined relative to a transaction time of current payment transaction 102 with which the transaction velocity is associated. Transaction velocities may leverage parameters or details associated with the techniques and methods used by fraudsters to initiate fraudulent payment transactions to identify those fraudulent payment transactions. Fraud modelling computing device 104 may calculate transaction velocities by summing and/or counting a parameter of historical transaction records 108 occurring prior to the current payment transaction 102 or during any other interval of interest.

As illustrated in FIG. 1, a person 114 (also referred to herein as a payor, customer, cardholder, suspect, and/or fraudster) initiates current payment transaction with a merchant 116, by providing payment card credentials 118. When person 114 initiates the current payment transaction, it is unknown if person 114 is a fraudster or, conversely, if person 114 is a legitimate cardholder using their payment card credentials to initiate an intended payment transaction. Accordingly, person 114 may be referred to as a suspect person, i.e., person 114 could be a fraudster.

In response to initiation of the current payment transaction, by person 114 at merchant 116, merchant 116 transmits current transaction request message 102 to at least one of issuer 112, payment processing network 110, and/or fraud modelling computing device 104, for further processing. In this illustrated embodiment, merchant 116 transmits current transaction request message 102 to payment processing network 110, and payment processing network 110 transmits current transaction request message 102 to fraud modelling computing device 104. In other example embodiments, merchant 116 may transmit current transaction request message 102 directly to fraud modelling computing device 104. In some example embodiments, payment processing network 110 may alter, add, and/or remove data from the current transaction request message 102 prior to transmitting current transaction request message to fraud modelling computing device 104.

Current transaction request message 102 includes data associated with the initiated current payment transaction, for example and without limitation, payment card credentials 118 including a payment card number, date and/or time of transaction, an indication of whether the current payment transaction was initiated at the location of merchant 116 or if the current payment transaction was initiated remotely, e.g., an online transaction. Current transaction request message 102 includes the transaction amount for the current payment transaction. Additionally or alternatively, current transaction request message 102 may include merchant location, merchant category code, and the like. Current transaction request message 102 may be a real-time authorization request message that includes a request for authorization of the current payment transaction.

In response to receiving current transaction request message 102, fraud modelling computing device 104 applies the multi-class fraud prediction model to current transaction request message 102 to generate one or more scores indicating a relative likelihood that the current payment transaction, initiated by suspect person 114, is each of the plurality of fraudulent transaction types.

Fraud modelling computing device 104 generates a transaction classification message 120 for the current payment transaction. Transaction classification message 120 includes at least one most likely transaction classification identifier associated with a respective at least one identified fraudulent transaction type and the score associated with the identified fraudulent transaction. Additionally or alternatively, transaction classification message 120 may include other fraudulent transaction types and associated scores. In some example embodiment, fraud modelling computing device 104 may append transaction classification message 120 to the real-time authorization request message.

Further, fraud modelling computing device 104 may generate transaction classification message 120 that includes a reason code. The reason code is associated with the at least one most likely fraudulent transaction type. For example, the reason code may include a rule or condition, used by the multi-class fraud prediction model, to generate one or more scores associated with the identified fraudulent transaction.

In some example embodiments, fraud modelling computing device 104 transmits transaction classification message 120 to issuer 112 of the payment card used to initiate the current payment transaction. In other example embodiments, fraud modelling computing device transmits transaction classification message 120 to payment processing network 110, and payment processing network 110 transmits transaction classification message 120 to issuer 112.

In some example embodiments, transaction classification message 120 may include an authorization response message. For example, if transaction classification message includes a transaction classification identifier indicating that current transaction request message 102 is a fraudulent transaction type of genuine, then transaction classification message 120 may include an authorization response message that approves further processing of the current payment transaction. In other examples, if transaction classification message 120 includes a transaction classification identifier indicating that the current payment transaction is a fraudulent transaction type of a fraud type, then transaction classification message 120 may include an authorization response message which declines or cancels further processing of current transaction request message 102.

In some example embodiments, issuer 112 may utilize the information contained in the transaction classification message 120 to approve or decline current payment transaction 102. Issuer 112 may transmit a response message 124 to payment processing network 110 indicating that the current payment transaction, associated with the current transaction request message 102, is either declined or approved.

In some example embodiments, fraud modelling computing device 104 (and/or payment processing network 110) may continuously or periodically update historical transaction database 106 by storing additional and/or new transaction records 108 to historical transaction database 106. New transaction records 108 may include information contained in transaction classification message 120. In some example embodiments, transaction classification message 120 may be stored in the historical transaction database 106. For example, at least one of the payment processing network 110 and/or fraud modelling computing device 104 may store transaction classification message 120 into historical transaction database 106. Fraud modelling computing device 104 may update the model training data to further include the new transaction records 108. For example, new transaction records 108 may include a plurality of fraudulent transaction types and associated scores. As such, the model training data may further include new transaction records 108, including a plurality of fraudulent transaction types and associated scores.

Figure 2:
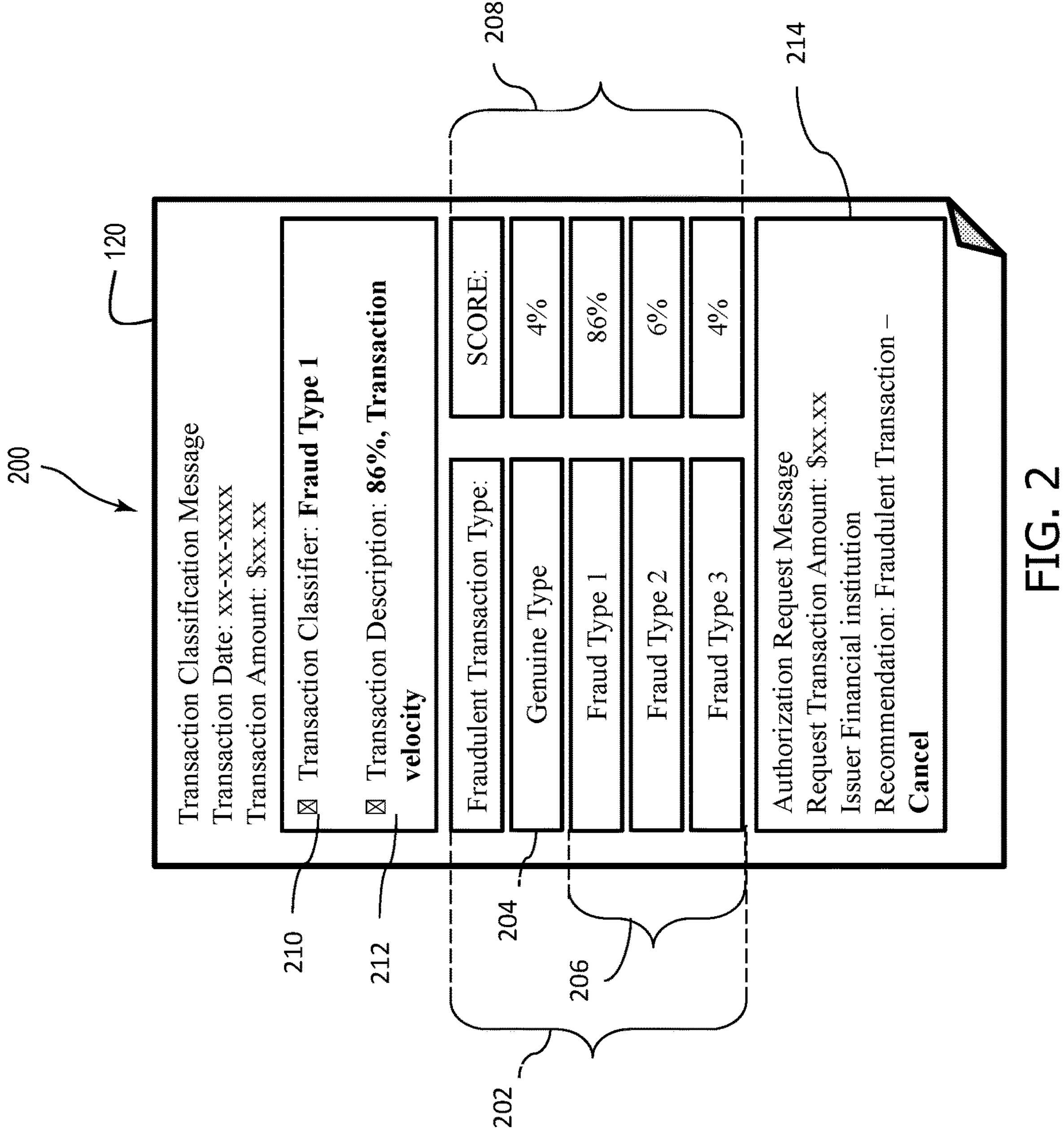

FIG. 2 depicts an example transaction classification message 200 (e.g., transaction classification message 120) generated by a fraud modelling computing device (e.g., fraud modelling computing device 104) of a fraudulent classification system (e.g., fraudulent detection system 100, all shown in FIG. 1). The fraud modelling computing device generates classification message 200 in response to receiving a current transaction request message (e.g., current transaction request message 102) from at least one of a payment processing network (e.g., payment processing network 110), an issuer (e.g., issuer 112), and/or a merchant (e.g. merchant 116) for a current payment transaction initiated by a person (e.g., person 114.) The fraud modelling computing device applies a multi-class fraud prediction model to the current transaction request message to generate one or more scores indicating a relative likelihood that the current payment transaction is each of the plurality of fraudulent transaction types. The fraud modelling computing device generates transaction classification message 200 for the current payment transaction, including at least one most likely transaction classification identifier associated with a respective at least one identified fraudulent transaction type and the score associated with the identified fraudulent transaction.

In this illustrated example classification message 200 includes a plurality of fraudulent transaction types 202 including a genuine type 204 and a plurality of fraud types 206. In the illustrated example, the plurality of fraud types 206 include: fraud type 1, fraud type 2, and fraud type 3. Genuine type 204 is associated with a genuine payment transaction. Each of fraudulent transaction types 202 is assigned a score 208. In this illustrated example, scores 208 may be associated with a percent likelihood. Score 208 represents the likelihood that the current payment transaction, of the transaction classification message 200, is each of fraudulent transaction types 202. For example, score 208 of genuine type 204 includes a percent likelihood of 4%, while score 208 of fraud type 1 has a percent likelihood of 86%. This indicates that the current payment transaction is more likely a fraud type 1 than a genuine transaction.

Classification message 200 further includes an at least one most likely transaction classification identifier 210 associated with a respective at least one identified fraudulent transaction type 202 and a score 208 associated with identified fraudulent transaction type 202. In this illustrated embodiment, transaction classification identifier is fraud type 1 which has a percent likelihood of 86%. The fraud modelling computing device may determine transaction classification identifier 210 by identifying which fraudulent transaction type 202 has the highest scores 208. Transaction classification identifier 210 of fraud type 1 has the highest score 208 of 86%.

In some embodiments, the fraud modelling computing device may include a transaction description 212 in transaction classification message 200. Fraud classification description 212 may include one or more rules and/or conditions associated with the multi-class fraud prediction model. For example, transaction description 212 may include a transaction velocity. Transaction velocities may leverage parameters or details associated with the techniques and methods used by fraudsters to initiate fraudulent payment transactions to identify those fraudulent payment transactions. The fraud modelling computing device may determine the transaction velocity by summing and/or counting a parameter of the historical transaction records occurring prior to the current payment transaction or during any other period of interest. In other examples, rationales for the transaction classification identifier may be associated with a rule or condition used by the multi-class fraud prediction model.

In other example embodiments, transaction classification message 200 may include additional or alternative data associated with the transaction. For example and without limitation, transaction classification message 200 may include the transaction amount, merchant details, dates/times of the current payment transaction, issuing financial institution, etc.

In some example embodiments, the fraud modelling computing device may append classification message 200 to include an authorization request message 214. Authorization message 214 may include a request to process and complete the current payment transaction. In other cases, authorization message 214 may include a recommendation. Classification message 200 illustrated in FIG. 2, the recommendation recommends "cancel" (or decline) because the current payment transaction has transaction classification identifier that is one of the plurality of fraud transaction type 206. In some example embodiments, transaction classification message 200 may include additional and/or alternative information that is necessary to process or complete (e.g., authorization) and/or to cancel (e.g., decline) and or report the transaction. Transaction classification message 200 may include additional/alternative recommendations or instructions, such as to implement additional authentication procedures (e.g., initiate a step-up challenge) or to implement fraud mitigation procedures (e.g., take a particular ATM offline, to notify a merchant about a breach, to decline transactions initiated using payment cards with a same BIN, etc.).

Figure 3:
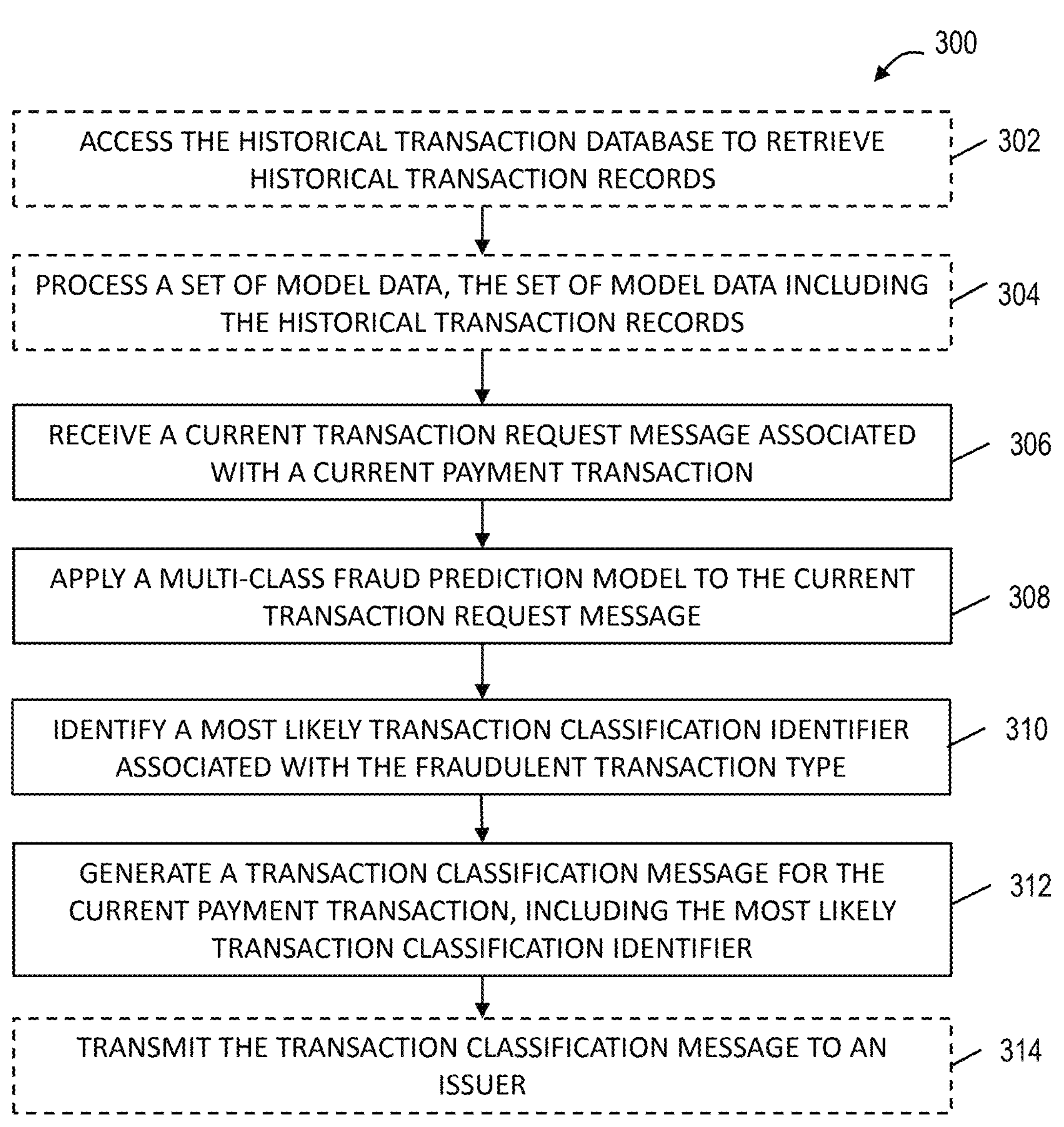

FIG. 3 is a process flow diagram of an example fraud classification method 300 for generating a transaction classification message (e.g., transaction classification message 120, shown in FIG. 1, or classification message 200, shown in FIG. 2) for classifying a current payment transaction with a fraudulent transaction classification system (e.g., fraudulent classification system 100, shown in FIG. 1). Method 300 may be implemented at least in part by a fraud modelling computing device (e.g., fraud modelling computing device 104, shown in FIG. 1).

In some example embodiments, method 300 includes accessing 302 a historical transaction database (e.g., historical transaction database 106, shown in FIG. 1) to retrieve at least a subset of transaction records (e.g., transaction records 108, shown in FIG. 1). The historical transaction database stores a plurality of transaction records associated with a plurality of historical transactions. Each transaction record includes a transaction classification identifier, a merchant identifier, and a transaction amount. Each transaction classification identifier identifies a fraudulent transaction type assigned to historical transaction from a plurality of fraudulent transaction types. Alternatively or additionally, the transaction record includes a transaction date and a transaction time.

In some example embodiments, method 300 includes processing 304 model training data using machine learning techniques to generate a multi-class fraud prediction model. The model training data includes the subset of the historical transaction records. The fraud modelling computing device uses the model training data to train the multi-class fraud prediction model, such as to develop a set of rules or conditions that may be applied to a current payment transaction message and generate or output scores representative of a plurality of fraudulent transaction types for each payment transaction.

In this example embodiment, method 300 further includes receiving 306, from at least one of a payment processing network (e.g., payment processing network 110), an issuer (e.g., issuer 112) and/or a merchant (e.g., merchant 116), a current transaction request message (e.g., current request transaction message 102) associated with a current payment transaction initiated by a suspect consumer (e.g., person 114, all shown in FIG. 1) with a merchant using a payment card. The current transaction request message includes a merchant identifier of the merchant and a transaction amount for the current payment transaction. The current transaction request message may also include payment card credentials and additional or alternative information associated with the current payment transaction. Details associated with the current payment transaction may include merchant location information, payment initiation location, payment amount, transaction dates and time. In some example embodiments, the current transaction request message is a real-time authorization request message.

The fraud modelling computing device may change or alter the model training data to include additional and/or alternative data. For example and without limitation, method 300 may further include determining a current transaction velocity relative to a transaction time of the current payment transaction. Current transaction velocities may be calculated by summing and/or counting a parameter of historical transaction records occurring prior to the current payment transaction. For example, a first current transaction velocity may include counting the number of transactions including consecutive account numbers within a range of the account number of the current transaction occurring in the previous 24 hours prior to the initiation of the current transaction. In another example, a second current transaction velocity may include counting the number of transaction identified as fraudulent with the merchant at which the current transaction is initiated occurring in the previous 2 weeks prior to the initiation of the current transaction. Method 300 may further include updating the model training data to include one or more current transaction velocities.

In some example embodiments, method 300 includes updating the historical transaction database by storing a new transaction records, including data contained in the transaction classification message, to the historical transaction database. Further, in some example embodiments, method 300 includes updating the model training data to include the new transaction record.

The fraud modelling computing device generates a multi-class fraud prediction model using the model training data to determine a set of rules or conditions governing the relationship between current transaction velocities, historical transaction records, the current transaction request message, and the plurality of fraudulent transaction types. The multi-class fraud prediction model may use this set of rules and/or conditions to determine a plurality of scores associated with the plurality of fraudulent transaction types. Method 300 includes applying 308 the multi-fraud prediction model to the current transaction request message to generate one or more scores indicating a relative likelihood that the current transaction is each of the plurality of transaction types.

Method 300 further includes identifying 310 a most likely transaction classification identifier. The most likely transaction classification identifier is associated with the fraudulent transaction type that is scored as the most likely fraudulent transaction type. For example, the most likely transaction classification identifier may have the highest score compared with the scores of the other fraudulent transaction types.

Method 300 further includes generating 312 a transaction classification message (e.g., transaction classification message 200, shown in FIG. 2) for the current payment transaction. The transaction classification message includes the most likely transaction classification identifier (e.g., identified fraudulent transaction type 210) and the score (e.g., percent likelihood 208) associated with the identified fraudulent transaction. In some example embodiments, the transaction classification message includes a transaction description (e.g., transaction description 212). The transaction description is associated with the at least one most likely fraudulent transaction type. In other words, the transaction description may explain and/or describe rationale rule and/or a condition for why the identified transaction type has been identified for the current payment transaction. For example, the transaction description may include one or more transaction velocities.

In some example embodiments, method 300 further includes transmitting 314 the transaction classification message to the issuer of the payment card used to initiate the current payment transaction. In some other example embodiments, method 300 further includes appending the transaction classification message to the real-time authorization request message.

Figure 4:
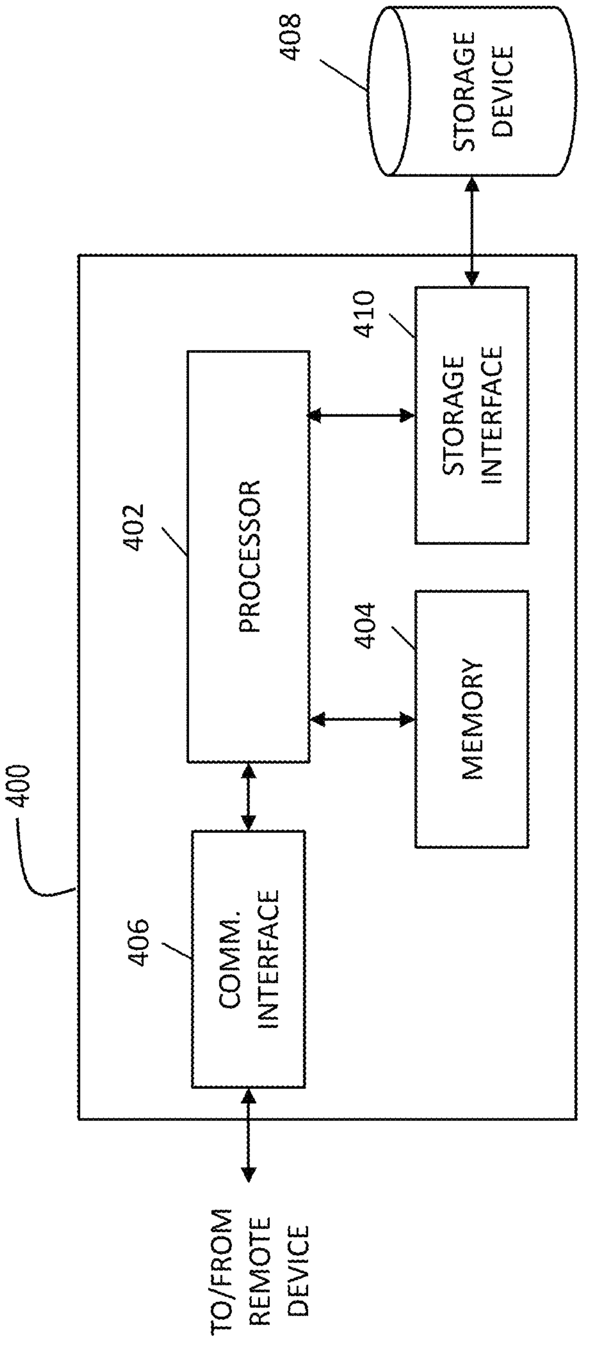

FIG. 4 illustrates an example configuration of a server computing device 400, such as an issuer processor associated with an issuer (e.g., issuer 112), a fraud modelling computing device (e.g., fraud modelling computing device 104), and/or a payment processing network computing device (e.g., a computing device of payment processing network 110, all shown in FIG. 1). Computing device 400 includes a processor 402 for executing instructions. Instructions may be stored to a memory 404. Processor 402 may include one or more processing units (e.g., in a multi-core configuration) for executing instructions. The instructions may be executed within a variety of different operating systems on data optimizing computing device, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 402 is operatively coupled to a communication interface 406 such that computing device 400 is capable of communication with remote devices. Processor 402 may also be operatively coupled to a storage device 408 (e.g., historical transaction database 106, shown in FIG. 1). Storage device 408 is any computer-operated hardware suitable for storing and/or retrieving data. In some embodiments, storage device 408 is integrated in computing device 400. For example, computing device 400 may include one or more hard disk drives as storage device 408. In other embodiments, storage device 408 is external to computing device 400. For example, storage device 408 may include multiple storage units such as hard disks or solid state disks in a redundant array of inexpensive disks (RAID) configuration. Storage device 408 may include a storage area network (SAN) and/or a network attached storage (NAS) system.

In some embodiments, processor 402 is operatively coupled to storage device 408 via a storage interface 410.

Storage interface is any component capable of providing processor 402 with access to storage device 408. Storage interface 410 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 402 with access to storage device 408.

Memory 404 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect includes generating and applying a multi-class fraud model to incoming, real-time transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A multi-class fraudulent classification computer system comprising at least one processor and a memory in communication with the at least one processor, the memory comprising computer-executable instructions stored therein, the computer-executable instructions being executable to cause the at least one processor to:

retrieve, from a historical transaction database, a plurality of transaction records, each transaction record associated with a corresponding one of a plurality of historical transactions and including a transaction classification identifier, a merchant identifier, and a transaction amount, wherein the transaction classification identifier is associated with a transaction type assigned to the historical transaction from among a plurality of transaction types, the plurality of transactions types including a genuine type and at least two fraudulent types, the at least two fraudulent types including a bank identification number (BIN) fraud type;

generate, from the retrieved plurality of transaction records, for subject transactions of the plurality of transactions, a transaction velocity by one of counting or summing a parameter for a set of transaction records recorded during a period of time prior to a respective one of the subject transactions;

generate, from the retrieved plurality of transaction records, model training data for the subject transactions of the plurality of transactions, wherein the model training data comprises, for each subject transaction, the transaction type and the generated transaction velocity;

train, in a first stage, using the model training data and a machine learning algorithm, a single multi-class fraud prediction model to receive an input transaction velocity for an input transaction and output a score for each of the plurality of transaction types, the score for each of the transaction types indicating a relative likelihood that the input transaction is of the transaction type, wherein the scores output by the model for each input transaction sum to unity across the plurality of transaction types;

receive a current transaction request message associated with a current payment transaction, the current transaction request message including an account identifier of a payment card used to initiate the transaction, a merchant identifier of the merchant and a transaction amount for the current payment transaction;

determine a current transaction velocity relative to a transaction time of the current payment transaction;

apply the trained single multi-class fraud prediction model to the current transaction comprising inputting the current transaction velocity and data included within the current transaction request message to the trained multi-class fraud prediction model and obtaining an output, in real-time, comprising, for each of the plurality of transaction types including a genuine type and at least two fraudulent types, the score for each transaction type indicating the relative likelihood that the current payment transaction is of the transaction type;

identify, based on the output, a most likely transaction type for the current payment transaction by comparing a magnitude of the scores including comparing the genuine score to each of the two fraudulent scores;

generate a transaction classification message for the current payment transaction, the transaction classification message including each of the plurality of transaction types including the genuine type and the at least two fraudulent types, the score for each transaction type indicating the relative likelihood that the current payment transaction is of the transaction type, and the identified most likely transaction type and the score associated with the identified most likely transaction type;

transmit the classification message to a computing device associated with an issuer of the payment card;

determine that the most likely transaction type of the current payment transaction is the BIN fraud type;

deploy, in response to the determination that the most likely transaction type of the current payment transaction is the BIN fraud type, computational resources to mitigate, for transactions subsequent to the current payment transaction, fraud associated with the most likely transaction type, wherein to deploy computational resources, the computer-executable instructions are executable to further cause the at least one processor to deploy a server that increases scrutiny of transactions subsequent to the current payment transaction having the same BIN as the current payment transaction; and retrain, in a second stage, the single multi-class fraud prediction model using second model training data including at least the current payment transaction and outputs from the fraud prediction model including each of the plurality of transaction types including a genuine type and at least two fraudulent types and a previously determined score for each of the genuine type and the at least two fraudulent types, wherein all of the scores included in the retraining sum to unity across the plurality of transaction types.

2. The multi-class fraudulent classification computer system in accordance with claim 1, wherein the current transaction request message is a real-time authorization request message.

3. The multi-class fraudulent classification computer system in accordance with claim 2, wherein the computer-executable instructions being executable to further cause the at least one processor to append the transaction classification message to the real-time authorization request message.

4. The multi-class fraudulent classification computer system in accordance with claim 1, wherein the transaction classification message includes a reason code, wherein the reason code is associated with the identified most likely transaction type.

5. The multi-class fraudulent classification computer system in accordance with claim 1, wherein the computer-executable instructions are executable to further cause the at least one processor to:

determine the current transaction velocity relative to the transaction time of the current payment transaction by determining a number of transactions occurring with the merchant prior to the transaction time.

6. The multi-class fraudulent classification computer system in accordance with claim 1, wherein the computer-executable instructions are executable to further cause the at least one processor to:

determine the current transaction velocity relative to the transaction time of the current payment transaction by determining an average transaction amount for a plurality of transactions occurring over a period of time prior to the transaction time.

7. The multi-class fraudulent classification computer system in accordance with claim 1, wherein the computer-executable instructions are executable to further cause the at least one processor to:

determine the current transaction velocity relative to the transaction time of the current payment transaction by determining a number of account numbers within a range of account numbers for a plurality of transactions occurring over a period of time prior to the transaction time.

8. A computer-implemented method, the method implemented using a computing device including at least one processor and a memory in communication with the at least one processor, said method comprising computer-executable instructions executed by the at least one processor of:

retrieving, from a historical transaction database, a plurality of transaction records, each transaction record associated with a corresponding one of a plurality of historical transactions and including a transaction classification identifier, a merchant identifier, and a transaction amount, wherein the transaction classification identifier is associated with a transaction type assigned to the historical transaction from among a plurality of transaction types, the plurality of transactions types including a genuine type and at least two fraudulent types;

generating, from the retrieved plurality of transaction records, for subject transactions of the plurality of transactions, a transaction velocity by one of counting or summing a parameter for a set of transaction records recorded during a period of time prior to a respective one of the subject transactions;

generating, from the retrieved plurality of transaction records, model training data for the subject transactions of the plurality of transactions, wherein the model training data comprises, for each subject transaction, the transaction type and the generated transaction velocity;

training, using the model training data and a machine learning algorithm, a single multi-class fraud prediction model to receive an input transaction velocity for an input transaction and output a score for each of the plurality of transaction types, the score for each of the transaction types indicating a relative likelihood that the input transaction is of the transaction type, wherein the scores output by the model for each input transaction sum to unity across the plurality of transaction types;

receiving a current transaction request message associated with a current payment transaction, the current transaction request message including an account identifier of a payment card used to initiate the transaction, a merchant identifier of the merchant and a transaction amount for the current payment transaction;

determining a current transaction velocity relative to a transaction time of the current payment transaction;

applying the trained single multi-class fraud prediction model to the current transaction comprising inputting the current transaction velocity and data included within the current transaction request message to the trained multi-class fraud prediction model and obtaining an output, in real-time, comprising, for each of the plurality of transaction types including a genuine type and at least two fraudulent types, the score for each transaction type indicating the relative likelihood that the current payment transaction is of the transaction type;

identifying, based on the output, a most likely transaction type for the current payment transaction by comparing a magnitude of the scores including comparing the genuine score to each of the two fraudulent scores;

generating a transaction classification message for the current payment transaction, the transaction classification message including each of the plurality of transaction types including the genuine type and the at least two fraudulent types, the score for each transaction type indicating the relative likelihood that the current payment transaction is of the transaction type, and the identified most likely transaction type and the score associated with the identified most likely transaction type;

transmitting the classification message to a computing device associated with an issuer of the payment card;

determining that the most likely transaction type of the current payment transaction is one of the at least two fraudulent types;

deploying, in response to the determination that the most likely transaction type of the current payment transaction is one of the at least two fraudulent types, computational resources to mitigate, for transactions subsequent to the current payment transaction, fraud associated with the most likely transaction type, wherein deploying computational resources, the computer-executable instructions are executable to further cause the at least one processor to deploy a server that increases scrutiny of transactions subsequent to the current payment transaction; and retraining, in a second stage, the single multi-class fraud prediction model using second model training data including at least the current payment transaction and outputs from the fraud prediction model including each of the plurality of transaction types including a genuine type and at least two fraudulent types and a previously determined score for each of the genuine type and the at least two fraudulent types, wherein all of the scores included in the retraining sum to unity across the plurality of transaction types.

9. The computer-implemented method in accordance with claim 8, wherein determining the current transaction velocity relative to the transaction time of the current payment transaction further comprises:

determining a number of transactions occurring with the merchant prior to the transaction time.

10. The computer-implemented method in accordance with claim 8, wherein determining the current transaction velocity relative to the transaction time of the current payment transaction further comprises:

determining an average transaction amount for a plurality of transactions occurring over a period of time prior to the transaction time.

11. The computer-implemented method in accordance with claim 8, wherein determining the current transaction velocity relative to the transaction time of the current payment transaction further comprises:

determining a number of account numbers within a range of account numbers for a plurality of transactions occurring over a period of time prior to the transaction time.

12. The computer-implemented method of claim 8, wherein determining that the most likely transaction type is one of the at least two fraudulent types comprises determining that the most likely transaction type of the current payment transaction is a BIN fraud type, and wherein deploying computational resources comprises deploying at least one more server than a current number of already deployed servers that increases scrutiny of transactions subsequent to the current payment transaction having the same BIN as the current payment transaction.

13. A non-transitory computer-readable storage medium that includes computer-executable instructions executable by at least one processor of a multi-class fraudulent classification computer system to cause the at least one processor to:

retrieve, from a historical transaction database, a plurality of transaction records, each transaction record associated with a corresponding one of a plurality of historical transactions and including a transaction classification identifier, a merchant identifier, and a transaction amount, wherein the transaction classification identifier is associated with a transaction type assigned to the historical transaction from among a plurality of transaction types, the plurality of transactions types including a genuine type and at least two fraudulent types;

generate, from the retrieved plurality of transaction records, for subject transactions of the plurality of transactions, a transaction velocity by one of counting or summing a parameter for a set of transaction records recorded during a period of time prior to a respective one of the subject transactions;

generate, from the retrieved plurality of transaction records, model training data for the subject transactions of the plurality of transactions, wherein the model training data comprises, for each subject transaction, the transaction type and the generated transaction velocity;

train, using the model training data and a machine learning algorithm, a single multi-class fraud prediction model to receive an input transaction velocity for an input transaction and output a score for each of the plurality of transaction types, the score for each of the transaction types indicating a relative likelihood that the input transaction is of the transaction type, wherein the scores output by the model for each input transaction sum to unity across the plurality of transaction types;

receive a current transaction request message associated with a current payment transaction, the current transaction request message including an account identifier of a payment card used to initiate the transaction, a merchant identifier of the merchant and a transaction amount for the current payment transaction;

determine a current transaction velocity relative to a transaction time of the current payment transaction;

apply the trained single multi-class fraud prediction model to the current transaction comprising inputting the current transaction velocity and data included within the current transaction request message to the trained multi-class fraud prediction model and obtaining an output, in real-time, comprising, for each of the plurality of transaction types including a genuine type and at least two fraudulent types, the score for each transaction type indicating the relative likelihood that the current payment transaction is of the transaction type;

identify, based on the output, a most likely transaction type for the current payment transaction by comparing a magnitude of the scores including comparing the genuine score to each of the two fraudulent scores;

generate a transaction classification message for the current payment transaction, the transaction classification message including each of the plurality of transaction types including the genuine type and the at least two fraudulent types, the score for each transaction type indicating the relative likelihood that the current payment transaction is of the transaction type, and identified the most likely transaction type and the score associated with the identified most likely transaction type; and transmit the classification message to a computing device associated with an issuer of the payment card;

determine that the most likely transaction type of the current payment transaction is one of the at least two fraudulent types;

deploy, in response to the determination that the most likely transaction type of the current payment transaction is one of the at least two fraudulent types, computational resources to mitigate, for transactions subsequent to the current payment transaction, fraud associated with the most likely transaction type, wherein to deploy computational resources, the computer-executable instructions are executable to further cause the at least one processor to deploy a server that increases scrutiny of transactions subsequent to the current payment transaction; and retrain, in a second stage, the single multi-class fraud prediction model using second model training data including at least the current payment transaction and outputs from the fraud prediction model including each of the plurality of transaction types including a genuine type and at least two fraudulent types and a previously determined score for each of the genuine type and the at least two fraudulent types, wherein all of the scores included in the retraining sum to unity across the plurality of transaction types.

14. The non-transitory computer-readable storage medium in accordance with claim 13, wherein the computer-executable instructions cause the processor to:

determine the current transaction velocity relative to the transaction time of the current payment transaction by determining a number of transactions occurring with the merchant prior to the transaction time.

15. The non-transitory computer-readable storage medium in accordance with claim 13, wherein the computer-executable instructions cause the processor to:

determine the current transaction velocity relative to the transaction time of the current payment transaction by determining an average transaction amount for a plurality of transactions occurring over a period of time prior to the transaction time.

16. The non-transitory computer-readable storage medium in accordance with claim 13, wherein the computer-executable instructions cause the processor to:

determine the current transaction velocity relative to the transaction time of the current payment transaction by determining a number of account numbers within a range of account numbers for a plurality of transactions occurring over a period of time prior to the transaction time.

17. The non-transitory computer-readable storage medium in accordance with claim 13, wherein to determine that the most likely transaction type of the current payment transaction is one of the at least two fraudulent types, the computer-executable instructions are executable by the at least one processor to determine that the most likely transaction type of the current payment transaction is a BIN fraud type, and wherein to deploy computational resources, the computer-executable instructions are executable by the at least one processor deploy at least one more server than a current number of already deployed servers that increases scrutiny of transactions subsequent to the current payment transaction having the same BIN as the current payment transaction.

* * * * *